US009429244B2

(12) United States Patent
Gao et al.

(10) Patent No.: US 9,429,244 B2
(45) Date of Patent: Aug. 30, 2016

(54) METHOD OF JOINING A CERAMIC PLUG TIP AND A STEEL SUPPORT MEMBER USING A THREADED JOINT AND AN ADHESIVE

(75) Inventors: Chun Gao, Tianjin (CN); Zhong Wei Yu, Tianjin (CN); Zhengyu Chen, Tianjin (CN)

(73) Assignee: EMERSON PROCESS MANAGEMENT (TIANJIN) VALVE CO., LTD, Tianjin (CN)

( * ) Notice: Subject to any disclaimer, the term of this patent is extended or adjusted under 35 U.S.C. 154(b) by 419 days.

(21) Appl. No.: 13/989,027

(22) PCT Filed: Dec. 1, 2010

(86) PCT No.: PCT/CN2010/079341
§ 371 (c)(1),
(2), (4) Date: Aug. 12, 2013

(87) PCT Pub. No.: WO2012/071723
PCT Pub. Date: Jun. 7, 2012

(65) Prior Publication Data
US 2013/0313464 A1    Nov. 28, 2013

(51) Int. Cl.
*F16K 1/38*     (2006.01)
*F16K 25/00*    (2006.01)
(Continued)

(52) U.S. Cl.
CPC .............. *F16K 25/005* (2013.01); *B29C 65/72* (2013.01); *F16K 1/38* (2013.01); *F16K 1/48* (2013.01); *Y10T 137/6065* (2015.04)

(58) Field of Classification Search
CPC .............. F16K 1/12; F16K 1/36; F16K 1/38; F16K 1/385; F16K 1/54; F16K 27/0254; F16K 31/1221; Y10T 137/6065

USPC ................. 251/122, 356, 357, 366
See application file for complete search history.

(56) References Cited

U.S. PATENT DOCUMENTS 3,211,164 A    10/1965   Bender et al.
3,262,673 A *   7/1966   Seeley ........................ 251/357
(Continued)

FOREIGN PATENT DOCUMENTS

CN    1606671 A    4/2005
GB    1288028 A    9/1972
JP    8-86376      4/1996

OTHER PUBLICATIONS

Internet Archive Wayback Machine, Wisetool; https://web.archive.org/web/20070104030016/http://www.wisetool.com/designation/te.htm; first published Jan. 4, 2007; accessed via internet on Jun. 23, 2015.*

(Continued)

*Primary Examiner* — Matthew W Jellett
(74) *Attorney, Agent, or Firm* — Marshall, Gerstein & Borun LLP (57) ABSTRACT

A valve plug assembly includes a support member having a support member body having a first end and a second end. A stem bore adapted to receive a valve stem may extend axially inward from the second end, and a mating protrusion may extend axially outward from the first end. The valve plug assembly also includes a plug tip having a first end and a second end, and a plug surface adapted to engage a valve seat is disposed adjacent to the first end. A mating bore may extend axially inward from the second end, and the mating protrusion may be received into the mating bore such that a threaded portion of the mating protrusion engages a threaded portion of the mating bore. Additionally, an adhesive bonds the threaded portion of the mating protrusion to the threaded portion of the mating bore.

20 Claims, 5 Drawing Sheets

(51) Int. Cl.
*F16K 1/48* (2006.01)
*B29C 65/72* (2006.01)

(56) References Cited

U.S. PATENT DOCUMENTS

| | | | | |
|---|---|---|---|---|
| 3,352,534 | A | * | 11/1967 | Harley .......................... 251/356 |
| 3,472,481 | A | | 10/1969 | Spies, Jr. |
| 3,572,633 | A | * | 3/1971 | Gaffney ........................ 251/356 |
| 3,894,722 | A | * | 7/1975 | Jones ........................ 366/160.3 |
| 4,575,047 | A | * | 3/1986 | Boos et al. .................. 251/356 |
| 5,201,335 | A | * | 4/1993 | Osgood et al. ............ 137/15.24 |
| 6,769,666 | B2 | | 8/2004 | Hall et al. |
| 6,793,198 | B2 | * | 9/2004 | Robison et al. .............. 251/357 |
| 6,820,857 | B1 | | 11/2004 | Lancaster |
| 7,270,879 | B2 | * | 9/2007 | McCrary ........................ 428/402 |
| 7,721,753 | B2 | * | 5/2010 | Wears ...................... 137/315.27 |
| 2010/0140530 | A1 | | 6/2010 | Robison |
| 2012/0286183 | A1 | * | 11/2012 | McCarty ........................ 251/357 |

OTHER PUBLICATIONS

International Search Report for Application No. PCT/CN2010/079341, dated Sep. 8, 2011.
Extended European Search Report for Application No. 10860311.9, dated May 6, 2015.

\* cited by examiner

METHOD OF JOINING A CERAMIC PLUG TIP AND A STEEL SUPPORT MEMBER USING A THREADED JOINT AND AN ADHESIVE

FIELD OF THE DISCLOSURE

This disclosure relates to valve components in general, and the joining of a valve plug tip to a support member in particular.

BACKGROUND OF THE INVENTION

Many valve applications, particularly applications involving medium and low temperature environments, require a valve plug tip fabricated from a material that resists both corrosion and erosion. Accordingly, the plug tip is often made from a ceramic material, such as tungsten carbide. The selected valve plug tip is coupled to a steel support member typically by using a brazing process in conjunction with multiple heat treatments often at temperatures in excess of 1300° F. After the assembly cools, the support member is coupled to a valve stem. The valve stem is operatively coupled to an actuation mechanism that displaces the valve stem such that a sealing surface on the plug tip sealingly engages a valve seat or disengages from the valve seat.

BRIEF SUMMARY OF THE INVENTION

In accordance with one exemplary aspect of the present invention, a valve plug assembly includes a support member having a support member body having a first end and a second end opposite the first end. The support member also has an axially disposed first mating feature disposed adjacent the first end of the support member body, and the first mating feature has a threaded portion. The support member also has a stem mating feature disposed proximate to the second end of the support member body, and the stem mating feature is adapted to secure the support member to a valve stem. The support member is made from a metal material. The valve plug assembly also includes a plug tip having a first end and a second end opposite the first end. The plug tip also has an axially disposed second mating feature disposed adjacent the second end, and the second mating feature has a threaded portion. The plug tip also has a plug sealing surface disposed proximate the first end, and the plug sealing surface is adapted to sealingly engage a valve seat. The plug tip is made from a ceramic material. The valve plug assembly also includes an adhesive. The threaded portion of the first mating feature of the support member engages the threaded portion of the second mating feature of the plug tip, and the adhesive bonds to at least a portion of the threaded portion of the first mating feature and at least a portion of the threaded portion of the second mating feature to secure the plug tip to the support member.

In another aspect of the present invention, the first mating feature is a mating protrusion extending axially outward from the first end of the support member body, and the threaded portion is disposed on an outer surface of the mating protrusion. Additionally, the second mating feature is a mating bore extending axially inward from the second end towards the first end of the plug tip, and the threaded portion is disposed on a side surface of the mating bore. Also, the mating protrusion of the support member is received into the mating bore of the plug tip such that the threaded portion of the mating protrusion threadedly engages the threaded portion of the mating bore, and the adhesive bonds at least a portion of the threaded portion of the mating protrusion to at least a portion of the threaded portion of the mating bore.

In a further aspect of the present invention, the ceramic material is tungsten carbide and the metal material is steel. In another aspect of the present invention, the adhesive is an epoxy adhesive. In still another aspect of the present invention, the ceramic material is selected to have a coefficient of thermal expansion between $0.7 \times 10^{-5}/°$ C. and $0.4 \times 10^{-5}/°$ C. and wherein metal material is selected to have a coefficient of thermal expansion between $1.9 \times 10^{-5}/°$ C. and $1.1 \times 10^{-5}/°$ C.

In one more aspect of the present invention, the stem mating feature of the support member is a stem bore extending axially inward from the second end of the support member body towards the first end, and the stem bore is adapted to receive a portion of a valve stem.

In another aspect of the present invention, the mating protrusion of the support member has an upper surface, and the support member also has an intermediate surface disposed between an outer surface of the support member body and the outer surface of the mating protrusion. In a further aspect of the present invention, the mating bore of the plug tip is partially defined by a bottom bore surface, and a bottom plug surface is disposed proximate to the second end of the plug tip. In a still further aspect of the present invention, the bottom plug surface of the plug tip is disposed proximate to the intermediate surface of the support member, and the bottom bore surface of the mating bore of the plug tip is disposed proximate to the upper surface of the mating protrusion of the support member. In another aspect of the present invention, the bottom plug surface of the plug tip contacts the intermediate surface of the support member.

In a still further aspect of the present invention, the first mating feature is a support member mating bore extending axially inward from the first end of the support member body towards the second end of the support member body, and the threaded portion is disposed on a side surface of the support member mating bore. Additionally, the second mating feature is a plug protrusion extending axially outward from a bottom plug surface of the plug tip, and the threaded portion is disposed on an outer surface of the plug protrusion. The plug protrusion of the plug tip is received into the support member mating bore of the support member such that the threaded portion of the plug protrusion threadedly engages the threaded portion of the support member mating bore, and the adhesive bonds at least a portion of the threaded portion of the plug protrusion to at least a portion of the threaded portion of the support member mating bore.

In accordance with one more exemplary aspect of the present invention, a method of joining a valve plug assembly includes providing a metal support member having a support member body having a first end and a second end opposite the first end. The method also includes forming an axially disposed first mating feature on the support member, the first mating feature being disposed proximate the first end of the support member body, and the first mating feature having a threaded portion. A stem mating feature is formed on the support member, the stem mating feature being disposed proximate the second end of the support member body, wherein the stem mating feature is adapted to secure the support member to a valve stem. The method additionally includes providing a ceramic plug tip having a first end and a second end opposite the first end. The method also includes forming an axially disposed second mating feature on the plug tip, the second mating feature being disposed adjacent the second end, and the second mating feature having a threaded portion. A plug sealing surface is formed on the plug tip, the plug sealing surface being disposed proximate the first end, and the plug sealing surface is adapted to sealingly engage a valve seat. The method also includes applying an adhesive to one of the threaded portion of the first mating feature and the threaded portion of the second mating feature. Additionally, the method also includes threadingly engaging the threaded portion of the first mating feature to the threaded portion of the second mating feature such that the adhesive contacts at least a portion of the threaded portion of the first mating feature and at least a portion of the threaded portion of the second mating feature. Furthermore, the method includes curing the adhesive by heating the support member, the plug tip, and the adhesive to a temperature that does not exceed 400° F.

In another aspect of the present invention, the first mating feature is a mating protrusion extending axially outward from the first end of the support member body, and the threaded portion is disposed on an outer surface of the mating protrusion. Additionally, the second mating feature is a mating bore extending axially inward from the second end towards the first end of the plug tip, and the threaded portion is disposed on a side surface of the mating bore. Also, the mating protrusion of the support member is received into the mating bore of the plug tip such that the threaded portion of the mating protrusion threadedly engages the threaded portion of the mating bore, and the adhesive bonds at least a portion of the threaded portion of the mating protrusion to at least a portion of the threaded portion of the mating bore.

In a further aspect of the present invention, the ceramic plug tip is formed from tungsten carbide and the metal support member is formed from steel. In another aspect of the present invention, an epoxy adhesive is applied to one of the threaded portion of the first mating feature and the threaded portion of the second mating feature.

In one more aspect of the present invention, the first mating feature is a support member mating bore extending axially inward from the first end of the support member body towards the second end of the support member body, and the threaded portion is disposed on a side surface of the support member mating bore. Additionally, the second mating feature is a plug protrusion extending axially outward from a bottom plug surface of the plug tip, and the threaded portion is disposed on an outer surface of the plug protrusion. The plug protrusion of the plug tip is received into the support member mating bore of the support member such that the threaded portion of the plug protrusion threadedly engages the threaded portion of the support member mating bore, and the adhesive bonds at least a portion of the threaded portion of the plug protrusion to at least a portion of the threaded portion of the support member mating bore.

In accordance with one more exemplary aspect of the present invention, a fluid control valve includes a valve body having a fluid inlet, a fluid outlet, a passageway in fluid communication with the fluid inlet and the fluid outlet, and a valve seat in the passageway for controlling the fluid flow. The fluid control valve also includes an elongated valve stem having a first end and a second end, the first end being adapted to be coupled to a valve actuator, and the second end opposite the first end. A valve plug assembly is coupled to the second end of the valve stem, and the valve plug assembly includes a support member having a support member body having a first end and a second end opposite the first end. The support member also has an axially disposed first mating feature disposed adjacent the first end of the support member body, and the first mating feature has a threaded portion. The support member also has a stem mating feature disposed proximate to the second end of the support member body, and at least a portion of the second end of the valve stem is coupled to the stem mating feature to secure the support member to the valve stem. Additionally, the support member is made from a metal material. The valve plug assembly also includes a plug tip having a first end and a second end opposite the first end. The plug tip also has an axially disposed second mating feature disposed adjacent the second end, and the second mating feature has a threaded portion. The plug tip also has a plug sealing surface disposed proximate the first end, and the plug sealing surface is adapted to sealingly engage the valve seat. Also, the plug tip comprises a ceramic material. The valve plug assembly also includes an adhesive. The threaded portion of the first mating feature of the support member engages the threaded portion of the second mating feature of the plug tip, and the adhesive bonds to at least a portion of the threaded portion of the first mating feature and at least a portion of the threaded portion of the second mating feature to secure the plug tip to the support member.

In another aspect of the present invention, the first mating feature is a mating protrusion extending axially outward from the support member body, and the threaded portion is disposed on an outer surface of the mating protrusion. Additionally, the second mating feature is a mating bore extending axially inward from the second end towards the first end of the plug tip, and the threaded portion is disposed on a side surface of the mating bore. The mating protrusion of the support member is received into the mating bore of the plug tip such that the threaded portion of the mating protrusion threadedly engages the threaded portion of the mating bore, and the adhesive bonds at least a portion of the threaded portion of the mating protrusion to at least a portion of the threaded portion of the mating bore.

In one more aspect of the present invention, the ceramic material is tungsten carbide and the metal material is steel. In a further aspect of the present invention, the adhesive is an epoxy adhesive.

In a still further aspect of the present invention, the first mating feature is a support member mating bore extending axially inward from the first end of the support member towards the second end of the support member, and the threaded portion is disposed on a side surface of the support member mating bore. The second mating feature is a plug protrusion extending axially outward from a bottom plug surface of the plug tip, and the threaded portion is disposed on an outer surface of the plug protrusion. The plug protrusion of the plug tip is received into the support member mating bore of the support member such that the threaded portion of the plug protrusion threadedly engages the threaded portion of the support member mating bore, and the adhesive bonds at least a portion of the threaded portion of the plug protrusion to at least a portion of the threaded portion of the support member mating bore.

DETAILED DESCRIPTION OF THE INVENTION

Figure 1:
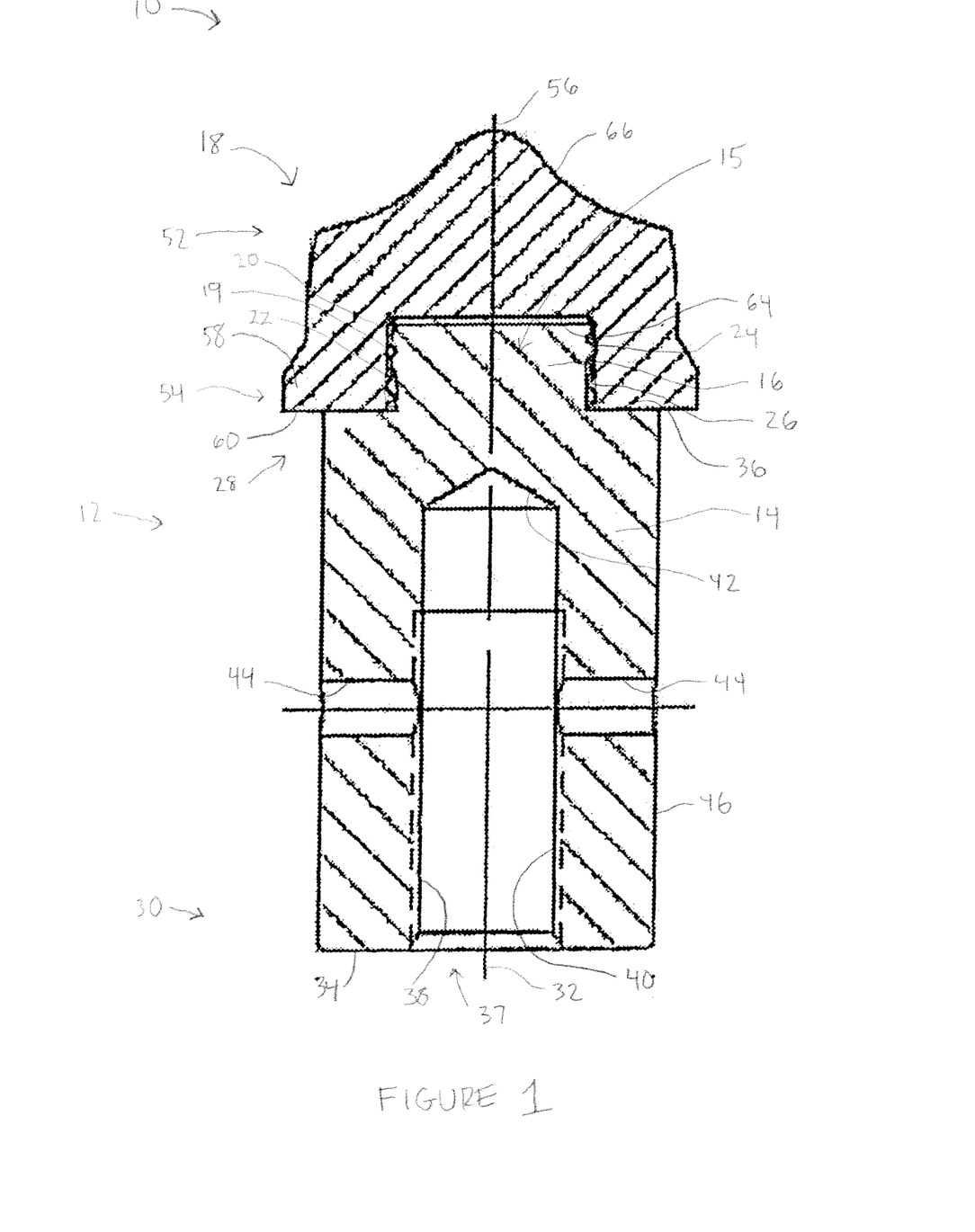
FIG. 1 is a sectional side view of an embodiment of the valve plug assembly.
Figure 2:
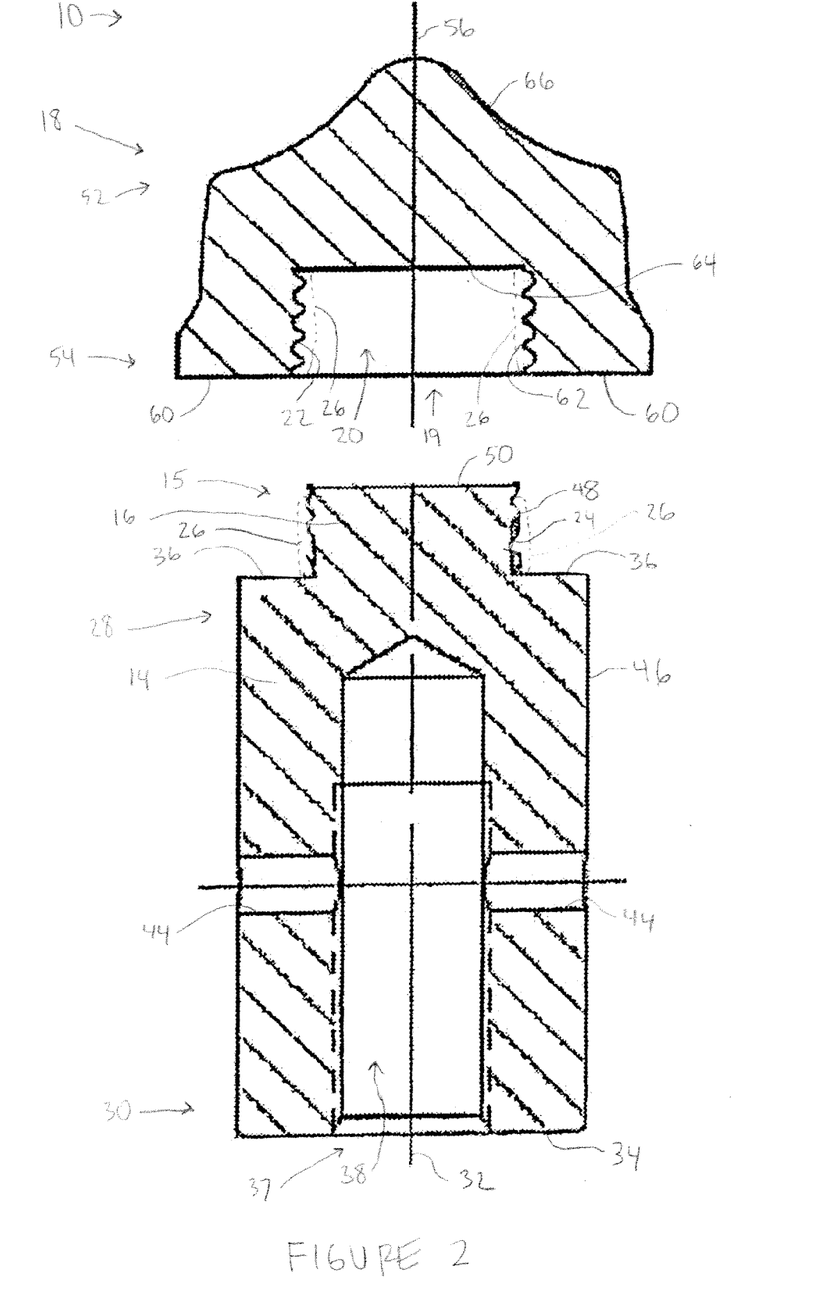
FIG. 2 is an exploded sectional side view of the valve plug assembly of FIG. 1.

As illustrated in FIGS. 1 and 2, a valve plug assembly 10 includes a support member 12 including a support member body 14 and a first mating feature 15, such as a mating protrusion 16 extending axially outward from the support member body 14. A plug tip 18 includes a second mating feature 19, such as an inwardly extending mating bore 20 having a threaded portion 22. The mating protrusion 16 of the support member 12 is received into the mating bore 20 of the plug tip 18, and the threaded portion 22 of the mating bore 20 threadedly engages a threaded portion 24 of the mating protrusion 16. An adhesive 26 bonds the threaded portion 22 of the mating bore 20 of the plug tip 18 to the threaded portion 24 of the mating protrusion 16, thereby securing the plug tip 18 to the support member 12.

As explained above and as shown in FIGS. 1 and 2, the support member 12 of the valve plug assembly 10 includes a support member body 14 and a first mating feature 15, such as a mating protrusion 16 extending axially outward from the support member body 14. The support member body 14 may have an elongated, cylindrical shape having a circular cross-section of a first diameter D1. However, the cross-section may have any shape or combination of shapes, including that of an oval or polygon. The support member body 14 has a first end 28 and a second end 30 opposite the first end 28. A longitudinal axis 32 of the support member 12 extends along the length of the support member body 14 and the support member body 14 may be symmetric about the longitudinal axis 32. A bottom surface 34 may be disposed adjacent the second end 30 of the support member body 14. The bottom surface 34 may be planar and may be oriented normal to the longitudinal axis 32 of the support member 12. An intermediate surface 36 may be disposed adjacent the first end 28 of the support member body 14. The intermediate surface 36 may be planar, and may be oriented parallel to the bottom surface 34.

Again referring to FIGS. 1 and 2, the support member 12 may include a valve stem mating feature 37, such as a stem bore 38 extending axially inward from the bottom surface 34 towards the first end 28 of the support member body 14. The stem bore 38 may be at least partially defined by a cylindrical side surface 40 and a conical surface 42. The stem bore 38 may be sized to receive a distal end of a valve stem 114 (shown in FIG. 5), and the valve stem 114 may be coupled to a valve actuator 118 (shown in FIG. 5) in a manner that will be described below. A pair of radial bores 44 may be formed on opposite sides of the support member body 14, and each radial bore 44 may extend from an outer surface 46 of the support member body 14 to the side surface 40 of the stem bore 38. Each radial bore 44 may be adapted to receive a set screw (not shown) that secures the valve stem to the support member 12. However, other coupling mechanisms may be used to secure the valve stem 114 to the support member body 14 of the valve plug assembly 10 instead of set screws. For example, a portion of the side surface 40 of the stem bore 38 may be threaded and may engage a threaded portion of the valve stem 114.

Instead of the stem bore 38 illustrated in FIGS. 1 and 2, the stem mating feature 37 may include a cylindrical protrusion (not shown) having a threaded side surface. The cylindrical protrusion may axially extend away from the bottom surface 34 of the support member 12. This cylindrical protrusion may be adapted to engage a bore (not shown) having a threaded side surface disposed proximate to an axial end portion of the valve stem (not shown).

Still referring to FIGS. 1 and 2, the support member 12 may include a mating protrusion 16 that extends away from the intermediate surface 36 at the first end 28 of the support member body 14 along the longitudinal axis 32 of the support member 12. The mating protrusion 16 may be cylindrical in shape and may have a circular cross-section of a second diameter D2, wherein the diameter D2 of the mating protrusion 16 is smaller than the diameter D1 of the support member body 14. An outer surface 48 partially defines the mating protrusion 16, and a threaded portion 24 is disposed on the outer surface 48. An upper surface 50 may define the top of the mating protrusion 16. The upper surface 50 may be planar and may be parallel to the intermediate surface 36.

The support member 12 may be made from a metal such as steel, including steel alloys and stainless steel. Such materials generally have a coefficient of thermal expansion between approximately $1.9 \times 10^{-5}/^\circ$ C. and approximately $1.1 \times 10^{-5}/^\circ$ C. Alternatively, the support member 12 may be made from aluminum, including aluminum alloys, and may have a coefficient of thermal expansion between approximately $2.3 \times 10^{-5}/^\circ$ C. and approximately $2.1 \times 10^{-5}/^\circ$ C. The support member 12 may be machined from a single piece of material, or may be an assembly of two or more component parts. For instance, the support member body 14 may be machined from a first piece of material and the mating protrusion 16 may be machined from a second piece of material. In this example, the support member body 14 may be secured to the mating protrusion 16 using any method commonly used in the art, such as welding, adhesives, or mechanical fasteners.

Referring again to FIGS. 1 and 2, the valve plug assembly 10 also includes a plug tip 18. The plug tip 18 has a first end 52 and a second end 54 opposite the first end 52. A longitudinal axis 56 extends along the length of the plug tip 18, and the plug tip 18 may be symmetric about the longitudinal axis 56. The plug tip 18 may have a generally cylindrical shape having a circular cross-section. However, the cross-section may have any shape or combination of shapes, including that of an oval or polygon. A flange 58 may be disposed around the circumference of the plug tip 18 proximate to the second end 54. A bottom plug surface 60 may be disposed adjacent the second end 54 of the plug tip 18, and the bottom surface 60 may be planar and may be oriented normal to the longitudinal axis 56.

Again referring to FIGS. 1 and 2, the plug tip 18 includes a second mating feature 19, such as a mating bore 20 extending in an inward direction from the bottom plug surface 60 towards the first end 52 of the plug tip 18 along the longitudinal axis 56. The mating bore 20 may be at least partially defined by a cylindrical side surface 62 and a planar bottom bore surface 64. The distance between the bottom plug surface 60 and the bottom bore surface 64 measured along the longitudinal axis 56 of the plug tip 18 may be greater than the distance between the intermediate surface 36 of the support member body 14 and the upper surface 50 of the mating protrusion 16 measured along the longitudinal axis 32 of the support member 12 such that when the plug tip 18 is secured to the mating protrusion 16 of the support member 12, a gap may exist between the bottom bore surface 64 of the mating bore 20 and the upper surface 50 of the mating protrusion 16. A threaded portion 22 may be formed on the side surface 62 of the mating bore 20. The mating bore 20 is sized to axially receive the mating protrusion 16 such that the threaded portion 24 formed on the outer surface 48 of the mating protrusion 16 engages the threaded portion 22 formed on the side surface 22 of the mating bore 20.

As shown in FIGS. 1 and 2, a plug sealing surface 66 may be disposed adjacent to the first end 52 of the plug tip 18. The plug sealing surface may be contoured and may be symmetrical about the longitudinal axis 56 of the plug tip 18. However, the plug sealing surface 66 may include any shape or combination of shapes that allow the plug sealing surface 66 to sealingly engage a valve seat.

The plug tip 18 made be made from a ceramic material, such as tungsten carbide or any other suitable ceramic material known in the art. It is known in the art that such ceramic materials have a significantly lower coefficient of thermal expansion than that of steel. For instance, the coefficient of thermal expansion for tungsten carbide typically ranges between approximately $0.7 \times 10^{-5}/°$ C. to approximately $0.4 \times 10^{-5}/°$ C.

When it is desired to secure the plug tip 18 to the support member 12, an adhesive 26 may be applied to the threaded portion 24 of the mating protrusion 16 of the support member 12. Alternatively, the adhesive 26 may instead be applied to the threaded portion 22 of the mating bore 20 of the plug tip 18, or to both the threaded portion 24 of the mating protrusion 16 and the threaded portion 22 of the mating bore 20. The adhesive 26 may be an epoxy adhesive. Alternatively, the adhesive 26 may be any other suitable adhesive or industrial glue, such as anaerobic adhesives, cyanoacrylate adhesives, toughened acrylics, silicone adhesives, phenolics, polyimide adhesives, or urethane adhesives.

After the application of the adhesive 26, the mating bore 20 of the plug tip 18 may be aligned with the mating protrusion 16 of the support member 12 such that the longitudinal axis 56 of the plug tip 18 is colinear with the longitudinal axis 32 of the support member 12. The mating protrusion 16 may then be inserted into the mating bore 20, and the plug tip 18 may be rotated such that the threaded portion 22 of the mating bore 20 of the plug tip 18 engages the threaded portion 22 of the mating protrusion 16 of the support member 12. The plug tip 18 may continue to be rotated until the bottom plug surface 60 of the plug tip 18 directly contacts at least a portion of the intermediate surface 36 of the support member 12, at which point the adhesive 26 contacts at least a portion of the threaded portion 24 of the mating protrusion 16 and at least a portion of the threaded portion 22 of the mating bore 20 of the plug tip 18. Alternatively, an intervening member (not shown), such as a washer, may be disposed between the bottom plug surface 60 of the plug tip 18 and the intermediate surface 36 of the support member 12. The assembly of the plug tip 18 and the support member 12 is then heated at a curing temperature between approximately 300° F. and 400° F., and preferably approximately 350° F., for a period of time adequate to fully cure the adhesive 26.

Figure 3:
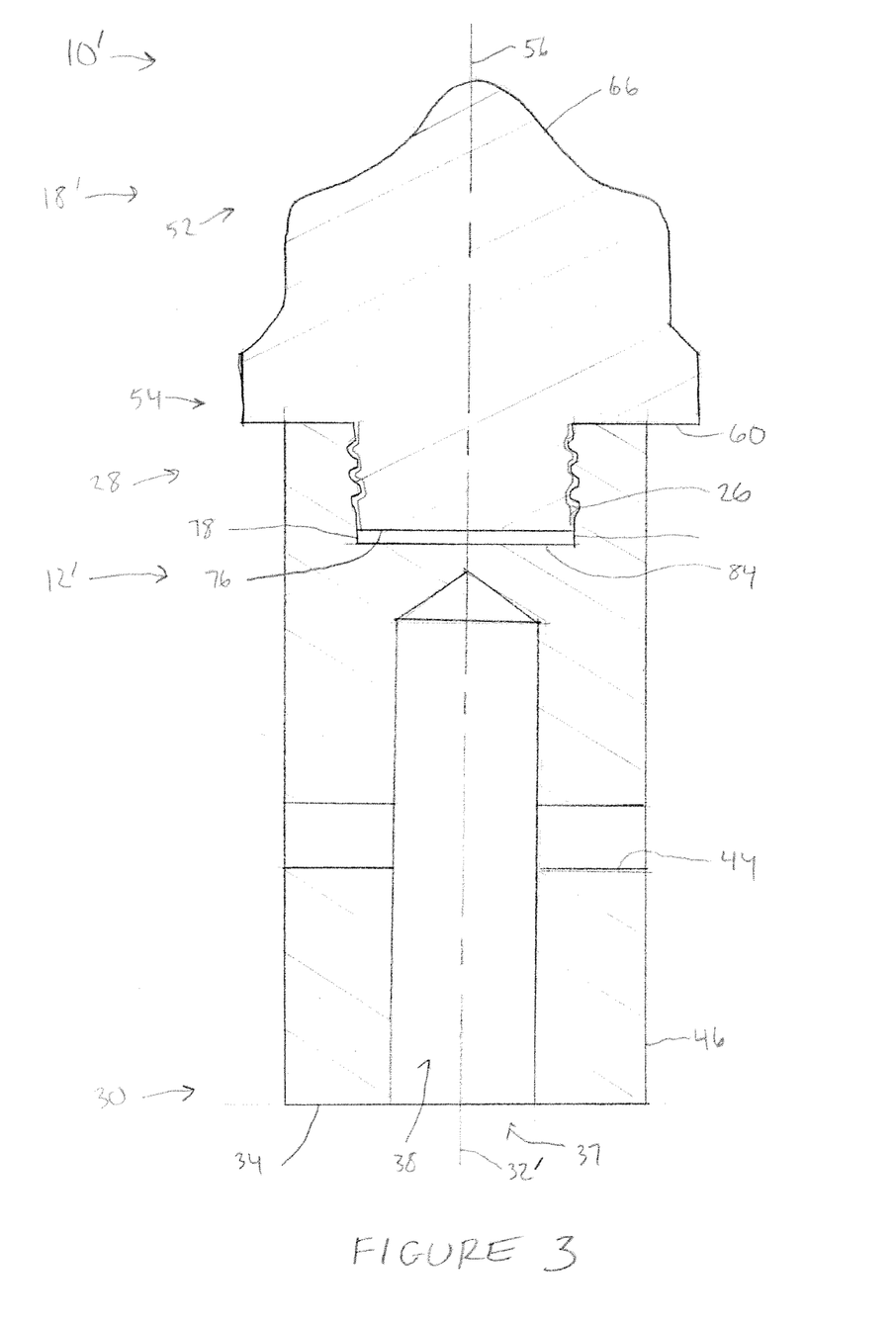
FIG. 3 is a sectional side view of an alternate embodiment of the valve plug assembly.
Figure 4:
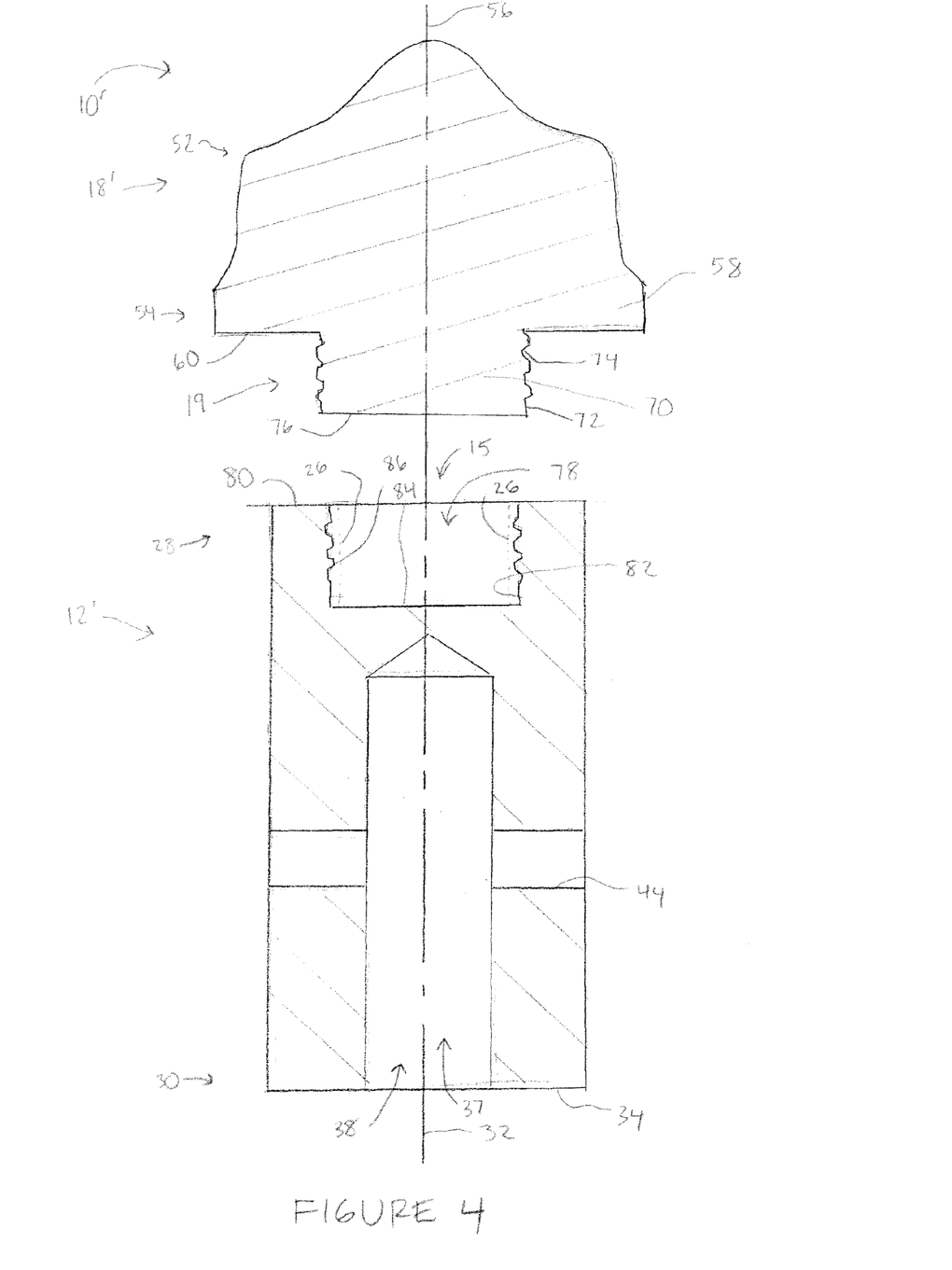
FIG. 4 is an exploded sectional side view of the valve plug assembly of FIG. 3.

FIGS. 3 and 4 illustrate an alternative embodiment of the valve plug assembly 10'. Because the alternate embodiment of the valve plug assembly 10' shares many of the same features as the previously-described valve plug assembly 10, only the features unique to the valve plug assembly 10' will be discussed. Instead of having a mating bore 20, the second mating feature 19 of the plug tip 18' of the valve plug assembly 10' includes a plug protrusion 70 extending away from the bottom plug surface 60 at the second end 54 of the plug tip 18' along the longitudinal axis 56 of the plug tip 18'. The plug protrusion 70 is cylindrical in shape having a circular cross-section. An outer surface 72 partially defines the plug protrusion 70, and a threaded portion 74 is disposed on the outer surface 72. A top surface 76 may define the top of the plug protrusion 70. The top surface 76 may be planar and may be parallel to the bottom plug surface 60. In order to reduce the amount of material used, the plug tip 18' may include a cylindrical interior bore (not shown) extending in an inward direction from the bottom plug surface 60 towards the first end 52 of the plug tip 18' along the longitudinal axis 56 of the plug tip 18'.

Again referring to FIGS. 3 and 4, the valve plug assembly 10' also includes a support member 12', and the support member 12' may have an elongated, cylindrical shape having a circular cross-section. However, the cross-section may have any shape or combination of shapes, including that of an oval or polygon. Instead of having a mating protrusion 16, the first mating feature 15 of the support member 12' includes a support member mating bore 78 adapted to receive the plug protrusion 70. Accordingly, the support member 12' may have a support member top surface 80 proximate to the first end 28 of the support member 12', and the support member top surface 80 may be planar and parallel to the bottom surface 34 at the second end 30 of the support member 12'. The support member mating bore 78 may extend inwardly from the support member top surface 80 towards the second end 30 of the support member 12' along the longitudinal axis 32 of the support member 12'.

The support member mating bore 78 may be at least partially defined by a cylindrical side surface 82 and a planar bottom bore surface 84. The distance between the support member top surface 80 and the bottom bore surface 84 measured along the longitudinal axis 32 of the support member 12' may be greater than the distance between the bottom plug surface 60 of the plug tip 18' and the top surface 76 of the plug protrusion 70 measured along the longitudinal axis 56 of the plug tip 18' such that when the plug tip 18' is secured to the support member 12', a gap may exist between the bottom bore surface 84 of the support member mating bore 78 and the top surface 76 of the plug protrusion 70. A threaded portion 86 may be formed on the side surface 82 of the support member mating bore 78. The support member mating bore 78 is sized to axially receive the plug protrusion 70 such that the threaded portion 74 formed on the outer surface 72 of the plug protrusion 70 engages the threaded portion 86 formed on the side surface 82 of the support member mating bore 78.

When it is desired to secure the plug tip 18' to the support member 12', an adhesive 26 may be applied to the threaded portion 74 of the plug protrusion 70 of the plug tip 18'. Alternatively, the adhesive 26 may instead be applied to the threaded portion 86 of the support member mating bore 20 of the support member 12', or to both the threaded portion 74 of the plug protrusion 70 and the threaded portion 86 of the support member mating bore 20. After the application of the adhesive 26, the support member mating bore 78 may be aligned with the plug protrusion 70 of the plug tip 18' such that the longitudinal axis 56 of the plug tip 18' is colinear with the longitudinal axis 32 of the support member 12'. The plug protrusion 70 may then be inserted into the support member mating bore 78, and the plug tip 18' may be rotated such that the threaded portion 86 of the support member mating bore 78 of the support member 12' engages the threaded portion 74 of the plug protrusion 70 of the plug tip 18'. The plug tip 18' may continue to be rotated until the bottom plug surface 60 of the plug tip 18' contacts at least a portion of the support member top surface 80 of the support member 12'. As previously described, the assembly of the plug tip 18' and the support member 12' is then heated at a temperature of approximately 350° F. to cure the adhesive 26.

Figure 5:
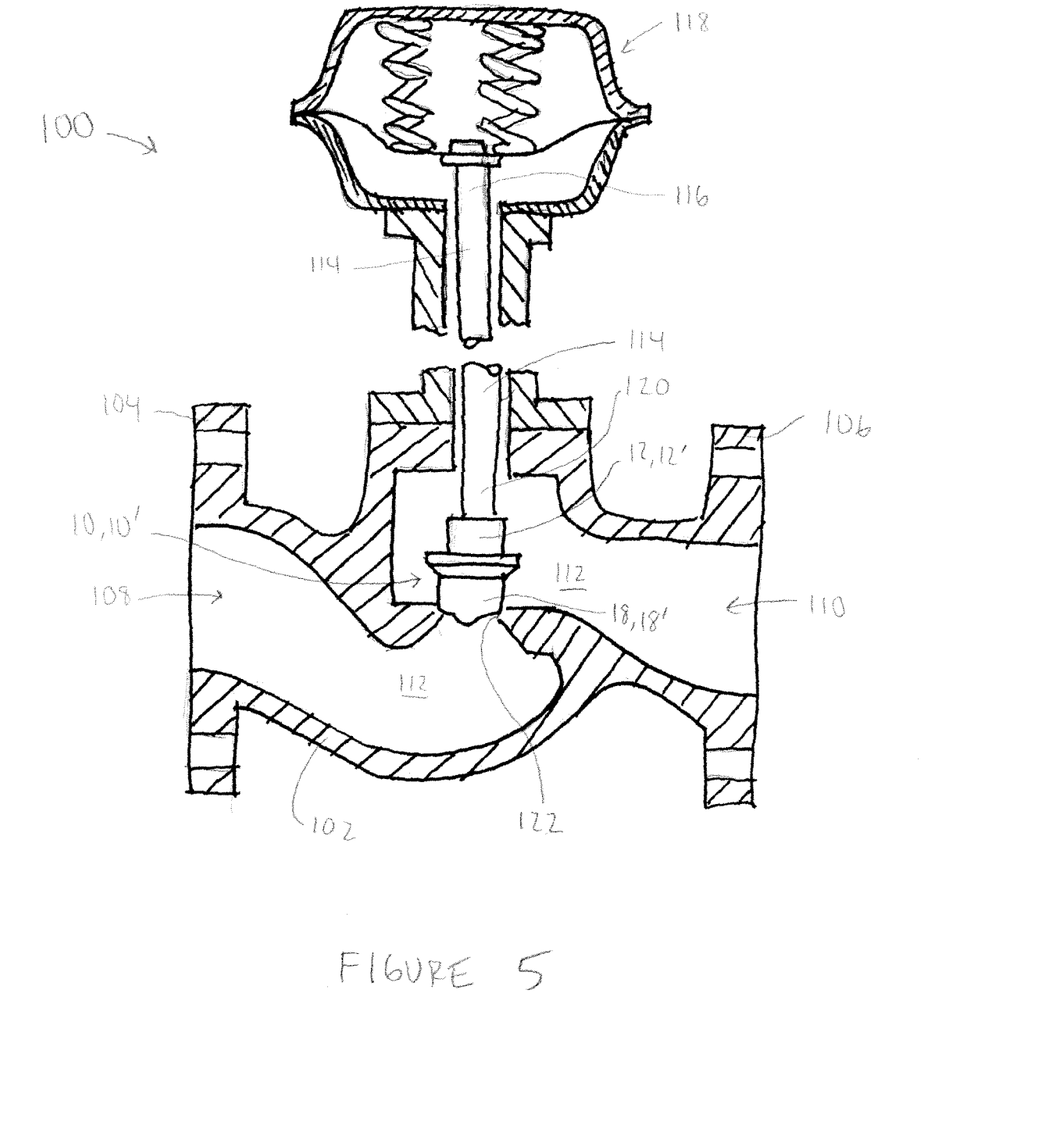
FIG. 5 is a sectional view of a control valve including an embodiment of the valve plug assembly.

FIG. 5 illustrates an example of a control valve 100 within which the disclosed valve plug assemblies 10, 10' can be used. The control valve assembly 100 includes a valve body 102, and the valve body 102 may include opposite mounting flanges 104, 106 for mounting the valve 100 in, for instance, a pipeline system. The valve body 102 also includes a fluid inlet 108 and a fluid outlet 110 with a passageway 112 in fluid communication with the fluid inlet 108 and the fluid outlet 110. An elongated valve stem 114 may be at least partially disposed within the valve body 102, and the valve stem 114 may have a first end 116 directly or indirectly coupled to a valve actuator 118 and a second end 120 that is directly or indirectly coupled to the support member 12, 12' of the valve plug assembly 10, 10' in a manner previously described. The valve actuator 118 axially displaces the valve stem 114 relative to a valve seat 122 provided in the passageway 112, and the axial force exerted by the valve actuator 118 may be provided by pressurized air supplied to a conventional spring and diaphragm actuator. The valve actuator 118 may axially displace the valve stem from a first closed position in which the plug sealing surface 66 of the plug tip 18, 18' sealingly engages the valve seat 122 to a second open position in which the plug sealing surface 66 of the plug tip 18, 18' does not sealingly engage the valve seat 122, thereby allowing fluid to flow from the fluid inlet 108 to the fluid outlet 110.

When the disclosed embodiments are assembled in accordance with the teachings of the present disclosure, the curing temperature of the adhesive 26 is considerably less than the process temperature of the brazing operation, where temperatures can exceed 1300° F. The low curing temperature also eliminates the need to heat treat the metal support member 12. In addition, the cured adhesive 26 acts as a cushion to both absorb impact energy between the plug tip 18 and the support member 12 as well as to compensate for thermal expansion differences between the ceramic plug tip 18 and the metal support member 12.

While various embodiments have been described above, this disclosure is not intended to be limited thereto. Variations can be made to the disclosed embodiments that are still within the scope of the appended claims.

What is claimed is:

1. A valve plug assembly comprising:
   a support member having a support member body extending along a support member longitudinal axis from a support member first end to a support member second end opposite the support member first end, the support member also having a first mating feature extending along the support member longitudinal axis and disposed adjacent the support member first end, wherein the first mating feature has a threaded portion, the support member also having a stem mating feature disposed proximate to the support member second end, the stem mating feature being adapted to secure the support member to a valve stem, and wherein the support member comprises a metal material;
   a plug tip extending along a plug tip longitudinal axis from a plug tip first end to a plug tip second end opposite the plug tip first end, the plug tip also having a second mating feature extending along the plug tip longitudinal axis and disposed adjacent the plug tip second end, wherein the second mating feature has a threaded portion, the plug tip also having a plug sealing surface disposed proximate the plug tip first end, the plug sealing surface being adapted to sealingly engage a valve seat, and wherein the plug tip comprises a ceramic material; and
   an adhesive,
   wherein the threaded portion of the first mating feature of the support member engages the threaded portion of the second mating feature of the plug tip such that a portion of the threaded portion of the first mating feature of the support member is in contact with a portion of the threaded portion of the second mating feature of the plug tip, and
   wherein the adhesive bonds to at least a portion of the threaded portion of the first mating feature and at least a portion of the threaded portion of the second mating feature to secure the plug tip to the support member.

2. The valve plug assembly of claim 1,
   wherein the first mating feature is a mating protrusion extending along the support member longitudinal axis outward from the support member first end, wherein the threaded portion is disposed on an outer surface of the mating protrusion,
   wherein the second mating feature is a mating bore extending along the plug tip longitudinal axis inward from the plug tip second end towards the plug tip first end, wherein the threaded portion is disposed on a side surface of the mating bore,
   wherein the mating protrusion of the support member is received into the mating bore of the plug tip such that the threaded portion of the mating protrusion threadedly engages the threaded portion of the mating bore, and
   wherein the adhesive bonds at least a portion of the threaded portion of the mating protrusion to at least a portion of the threaded portion of the mating bore.

3. The valve plug assembly of claim 1, wherein the ceramic material is tungsten carbide and the metal material is steel.

4. The valve plug assembly of claim 1, wherein the adhesive is an epoxy adhesive.

5. The valve plug assembly of claim 1, wherein the ceramic material is selected to have a coefficient of thermal expansion between $0.7 \times 10^{-5}/°$ C. and $0.4 \times 10^{-5}/°$ C. and wherein metal material is selected to have a coefficient of thermal expansion between $1.9 \times 10^{-5}/°$ C. and $1.1 \times 10^{-5}/°$ C.

6. The valve plug assembly of claim 1, wherein the stem mating feature of the support member comprises a stem bore extending inward along the support member longitudinal axis from the support member second end towards the support member first end, and wherein the stem bore is adapted to receive a portion of a valve stem.

7. The valve plug assembly of claim 2, wherein the mating protrusion of the support member has an upper surface, and the support member also has an intermediate surface disposed between an outer surface of the support member body and the outer surface of the mating protrusion.

8. The valve plug assembly of claim 7, wherein the mating bore of the plug tip is partially defined by a bottom bore surface, and a bottom plug surface is disposed proximate to the plug tip second end, and wherein the bottom plug surface of the plug tip is disposed proximate to the intermediate surface of the support member, and the bottom bore surface of the mating bore of the plug tip is disposed proximate to the upper surface of the mating protrusion of the support member.

9. The valve plug assembly of claim 8, wherein the bottom plug surface of the plug tip contacts the intermediate surface of the support member.

10. The valve plug assembly of claim 1, wherein the first mating feature is a support member mating bore extending along the support member longitudinal axis inward from the support member first end towards the support member second end, wherein the threaded portion is disposed on a side surface of the support member mating bore,
- wherein the second mating feature is a plug protrusion extending along the plug tip longitudinal axis outward from a bottom plug surface of the plug tip, wherein the threaded portion is disposed on an outer surface of the plug protrusion,
- wherein the plug protrusion of the plug tip is received into the support member mating bore of the support member such that the threaded portion of the plug protrusion threadedly engages the threaded portion of the support member mating bore, and
- wherein the adhesive bonds at least a portion of the threaded portion of the plug protrusion to at least a portion of the threaded portion of the support member mating bore.

11. A method of joining a valve plug assembly comprising:
- providing a metal support member having a support member body having a support member first end and a support member second end opposite the support member first end;
- forming a first mating feature on the support member, the first mating feature being disposed proximate the support member first end, and the first mating feature having a threaded portion;
- forming a stem mating feature on the support member, the stem mating feature being disposed proximate the support member second end, wherein the stem mating feature is adapted to secure the support member to a valve stem;
- providing a ceramic plug tip having a plug tip first end and a plug tip second end opposite the plug tip first end;
- forming a second mating feature on the plug tip, the second mating feature being disposed adjacent the plug tip second end, and the second mating feature having a threaded portion;
- forming a plug sealing surface on the plug tip, the plug sealing surface being disposed proximate the plug tip first end, wherein the plug sealing surface is adapted to sealingly engage a valve seat;
- applying an adhesive to at least one of the threaded portion of the first mating feature and the threaded portion of the second mating feature;
- threadingly engaging the threaded portion of the first mating feature to the threaded portion of the second mating feature such that the adhesive contacts at least a portion of the threaded portion of the first mating feature and at least a portion of the threaded portion of the second mating feature and such that a portion of the threaded portion of the first mating feature of the support member is in contact with a portion of the threaded portion of the second mating feature of the plug tip; and
- curing the adhesive by heating the support member, the plug tip, and the adhesive to a temperature that does not exceed 400° F.

12. The method of claim 11, wherein the first mating feature is a mating protrusion extending along a support member longitudinal axis outward proximate to the support member first end, wherein the threaded portion is disposed on an outer surface of the mating protrusion,
- wherein the second mating feature is a mating bore extending inward along a plug tip longitudinal axis from the plug tip second end towards the plug tip first end, wherein the threaded portion is disposed on a side surface of the mating bore, and
- wherein threadingly engaging the threaded portion of the first mating feature to the threaded portion of the second mating feature comprises inserting the mating protrusion of the support member into the mating bore of the plug tip such that the threaded portion of the mating protrusion threadedly engages the threaded portion of the mating bore and the adhesive bonds to at least a portion of the threaded portion of the mating protrusion and to at least a portion of the threaded portion of the mating bore.

13. The method of claim 11, wherein the ceramic plug tip is formed from tungsten carbide and the metal support member is formed from steel.

14. The method of claim 11, wherein an epoxy adhesive is applied to one of the threaded portion of the first mating feature and the threaded portion of the second mating feature.

15. The method of claim 11, wherein the first mating feature is a support member mating bore extending inward along a support member longitudinal axis from the support member first end towards the support member second end, wherein the threaded portion is disposed on a side surface of the support member mating bore,
- wherein the second mating feature is a plug protrusion extending outward along a plug tip longitudinal axis from a bottom plug surface of the plug tip, wherein the threaded portion is disposed on an outer surface of the plug protrusion, and
- wherein threadingly engaging the threaded portion of the first mating feature to the threaded portion of the second mating feature comprises inserting the plug protrusion of the plug tip into the support member mating bore of the support member such that the threaded portion of the plug protrusion threadedly engages the threaded portion of the support member mating bore and the adhesive bonds to at least a portion of the threaded portion of the plug protrusion and to at least a portion of the threaded portion of the support member mating bore.

16. A fluid control valve comprising:
- a valve body having a fluid inlet, a fluid outlet, a passageway in fluid communication with the fluid inlet and the fluid outlet, and a valve seat in the passageway for controlling the fluid flow;
- an elongated valve stem having a valve stem first end and a valve stem second end, the valve stem first end being adapted to be coupled to a valve actuator, and the valve stem second end opposite the valve stem first end;
- a valve plug assembly coupled to the second end of the valve stem, the valve plug assembly comprising:
- a support member having a support member body extending along a support member longitudinal axis from a support member first end to a support member second end opposite the support member first end, the support member also having an axially disposed first mating feature disposed adjacent the support member first end, wherein the first mating feature has a threaded portion, the support member also having a stem mating feature disposed proximate to the support member second end, and at least a portion of the valve stem second end is coupled to the stem mating feature to secure the support member to the valve stem, and wherein the support member comprises a metal material;

a plug tip extending along a plug tip longitudinal axis from a plug tip first end to a plug tip second end opposite the plug tip first end, the plug tip also having an axially disposed second mating feature disposed adjacent the plug tip second end, wherein the second mating feature has a threaded portion, the plug tip also having a plug sealing surface disposed proximate the plug tip first end, the plug sealing surface being adapted to sealingly engage the valve seat, and wherein the plug tip comprises a ceramic material; and an adhesive, wherein the threaded portion of the first mating feature of the support member engages the threaded portion of the second mating feature of the plug tip such that a portion of the threaded portion of the first mating feature of the support member is in contact with a portion of the threaded portion of the second mating feature of the plug tip, and wherein the adhesive bonds to at least a portion of the threaded portion of the first mating feature and at least a portion of the threaded portion of the second mating feature to secure the plug tip to the support member.

17. The fluid control valve of claim 16, wherein the first mating feature is a mating protrusion extending along the support member longitudinal axis outward from the support member body, wherein the threaded portion is disposed on an outer surface of the mating protrusion, wherein the second mating feature is a mating bore extending along the plug tip longitudinal axis inward from the plug tip second end towards the plug tip first end, wherein the threaded portion is disposed on a side surface of the mating bore, wherein the mating protrusion of the support member is received into the mating bore of the plug tip such that the threaded portion of the mating protrusion threadedly engages the threaded portion of the mating bore, and wherein the adhesive bonds at least a portion of the threaded portion of the mating protrusion to at least a portion of the threaded portion of the mating bore.

18. The valve plug assembly of claim 16, wherein the ceramic material is tungsten carbide and the metal material is steel.

19. The valve plug assembly of claim 16, wherein the adhesive is an epoxy adhesive.

20. The valve plug assembly of claim 16, wherein the first mating feature is a support member mating bore extending along the support member longitudinal axis inward from the support member first end towards the support member second end, wherein the threaded portion is disposed on a side surface of the support member mating bore, wherein the second mating feature is a plug protrusion extending along the plug tip longitudinal axis outward from a bottom plug surface of the plug tip, wherein the threaded portion is disposed on an outer surface of the plug protrusion, wherein the plug protrusion of the plug tip is received into the support member mating bore of the support member such that the threaded portion of the plug protrusion threadedly engages the threaded portion of the support member mating bore, and wherein the adhesive bonds at least a portion of the threaded portion of the plug protrusion to at least a portion of the threaded portion of the support member mating bore.

* * * * *